United States Patent
Subramanian et al.

(10) Patent No.: US 11,190,362 B2
(45) Date of Patent: Nov. 30, 2021

(54) RADIO FREQUENCY IDENTIFICATION BASED INTEGRATED COMPUTER WITH HARDWARE ACCELERATOR

(71) Applicant: International Business Machines Corporation, Armonk, NY (US)

(72) Inventors: Chitra Subramanian, Putnam, NY (US); Seiji Munetoh, Kawasaki (JP); Frank Robert Libsch, White Plains, NY (US); Daniel Joseph Friedman, Sleepy Hollow, NY (US); Ghavam G. Shahidi, Pound Ridge, NY (US); Arun Paidimarri, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 455 days.

(21) Appl. No.: 16/239,255

(22) Filed: Jan. 3, 2019

(65) Prior Publication Data
US 2020/0220736 A1    Jul. 9, 2020

(51) Int. Cl.
*H04L 9/32* (2006.01)
*H04L 9/30* (2006.01)
*G06K 19/07* (2006.01)
*G06K 19/077* (2006.01)

(52) U.S. Cl.
CPC .......... *H04L 9/3252* (2013.01); *G06K 19/077* (2013.01); *G06K 19/0709* (2013.01); *H04L 9/30* (2013.01)

(58) Field of Classification Search
None
See application file for complete search history.

(56) References Cited

U.S. PATENT DOCUMENTS

| 7,782,194 | B2 | 8/2010 | Stawar et al. |
| 9,565,022 | B1* | 2/2017 | Robshaw ............. H04L 9/3271 |
| 10,055,616 | B2 | 8/2018 | Bhargava et al. |
| 10,055,728 | B2 | 8/2018 | Deliwala et al. |
| 2005/0174236 | A1 | 8/2005 | Brookner |

(Continued)

FOREIGN PATENT DOCUMENTS

WO    2011039047 A1    1/2011

OTHER PUBLICATIONS

Al-Amir, et al., Design and implementation of RFID system, 2008 5th International Multi-Conference on Systems, Signals and Devices, Aug. 2008, 7 Pages.

(Continued)

*Primary Examiner* — Kristy A Haupt
(74) *Attorney, Agent, or Firm* — Amin, Turocy & Watson, LLP

(57) ABSTRACT

Devices, computer-implemented methods, and systems that can facilitate radio frequency identification components are provided. According to an embodiment, a device can comprise a memory that can be coupled to an integrated circuit device that can have a processor and an accelerator component that can execute a cryptographic module. The device can further comprise a radio frequency identification device that can be coupled to the integrated circuit device that can communicate with a radio frequency identification reader device based on the cryptographic module.

19 Claims, 10 Drawing Sheets

(56) References Cited

U.S. PATENT DOCUMENTS

2006/0085844 A1* 4/2006 Buer .................. H04L 9/30
                                                                726/4
2018/0069693 A1   3/2018 Boivie et al.
2018/0144232 A1* 5/2018 DeBates ............ G06K 7/10366

OTHER PUBLICATIONS

WISP5, WISP Home, http://wisp5.wikispaces.com/WISP+Home, Last accessed Sep. 13, 2018, 2 pages.

Hruska, New microcontroller runs on radio waves, can be reprogrammed in the field, https://www.extremetech.com/computing/227326-new-programmable-microcontroller-runs-on-radio-waves-can-be-reprogrammed-in-the-field, Last accessed Jan. 2, 2019, 7 pages.

RF30FRL152H, http://www.ti.com/product/RF430FRL152H, Last accessed Jan. 2, 2019, 3 Pages.

Medusa-M2233, http://www.farsens.com/en/products/medusa-m2233/, Last accessed Jan. 2, 2019.

Mel, et al., The NIST Definition of Cloud Computing, National Institute of Standards and Technology Special Publication 800-145, Sep. 2011, 7 Pages.

* cited by examiner

US 11,190,362 B2

RADIO FREQUENCY IDENTIFICATION BASED INTEGRATED COMPUTER WITH HARDWARE ACCELERATOR

BACKGROUND

The subject disclosure relates to radio frequency identification systems, and more specifically, to radio frequency identification devices that can implement cryptographic modules.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, and/or computer-implemented methods that can facilitate radio frequency identification components are described.

According to an embodiment, a device can comprise a memory that can be coupled to an integrated circuit device that can have a processor and an accelerator component that can execute a cryptographic module. The device can further comprise a radio frequency identification device that can be coupled to the integrated circuit device that can communicate with a radio frequency identification reader device based on the cryptographic module.

According to another embodiment, a computer-implemented method can comprise executing, by a radio frequency identification device operatively coupled to a processor, a cryptographic module. The computer-implemented method can further comprise communicating, by the radio frequency identification device, with a radio frequency identification reader device based on the cryptographic module.

According to another embodiment, a system can comprise a radio frequency identification tag device that can have a memory that can be coupled to an integrated circuit device that can comprise a processor and an accelerator component that can execute a cryptographic module. The system can further comprise a radio frequency identification reader device that can communicate with the radio frequency identification tag device based on the cryptographic module.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It is noted that the drawings of the present application are provided for illustrative purposes only and, as such, the drawings are not drawn to scale.

Figure 1:
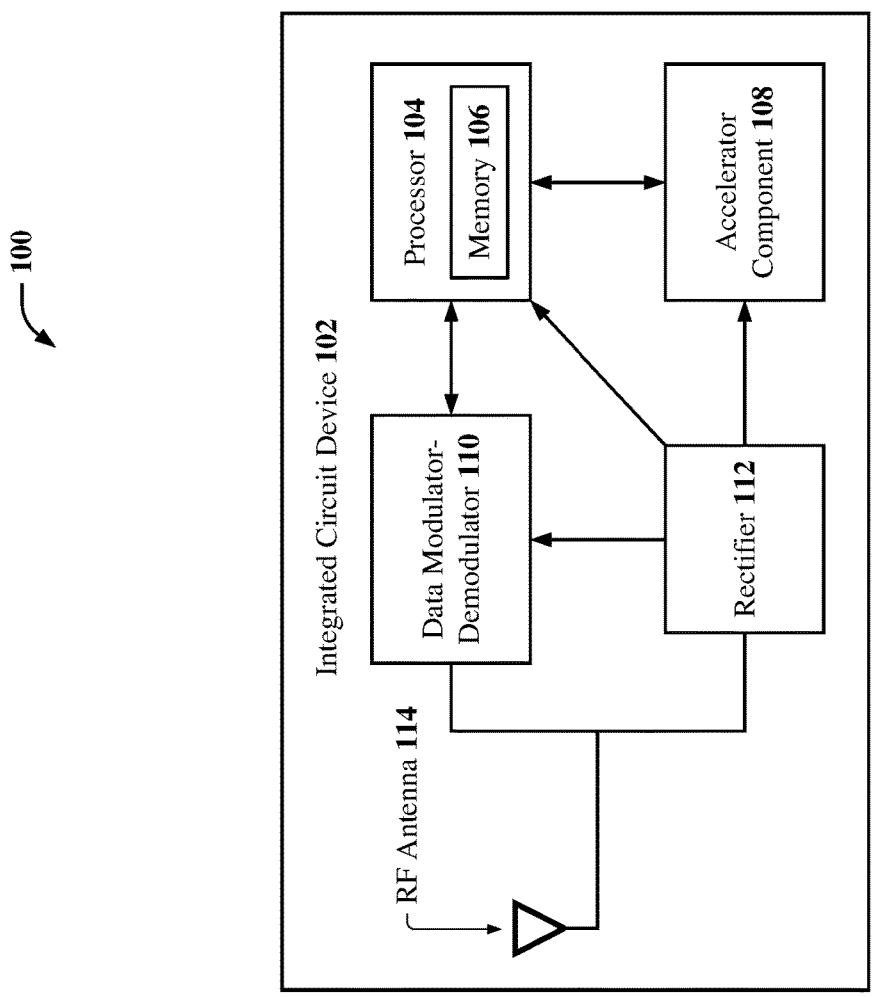
FIG. 1 illustrates a block diagram of an example, non-limiting system that can facilitate radio frequency identification components in accordance with one or more embodiments described herein.

FIG. 1 illustrates a block diagram of an example, non-limiting system 100 that can facilitate radio frequency identification components in accordance with one or more embodiments described herein. In some embodiments, system 100 can comprise an integrated circuit device 102, which can be implemented in a computing device (e.g., a radio frequency identification (RFID) tag device, an Internet of Things (IoT) device, etc.) that can be associated with a cloud computing environment. For example, integrated circuit device 102 can be implemented in a computing device that can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with FIG. 1, according to several embodiments, system 100 can comprise an integrated circuit device 102. In some embodiments, integrated circuit device 102 can comprise a processor 104, an accelerator component 108, a data modulator-demodulator 110, a rectifier 112, and/or a radio frequency (RF) antenna 114. In some embodiments, processor 104 can comprise a memory 106, which can constitute a memory coupled to integrated circuit device 102.

According to multiple embodiments, integrated circuit device 102 and/or components thereof can comprise an integrated circuit fabricated in a semiconducting device. For example, the various embodiments of integrated circuit device 102 and/or components thereof described herein and/or illustrated in the figures can comprise an integrated circuit fabricated in a semiconducting device that can be implemented in a computing device including, but not limited to, a radio frequency identification (RFID) tag device, an Internet of Things (IoT) device, and/or another computing device. For instance, the various embodiments of integrated circuit device 102 and/or components thereof described herein and/or illustrated in the figures can comprise a System on a Chip (SOC) device that can be implemented in one or more computing devices described above.

In some embodiments, fabrication of the various embodiments of integrated circuit device 102 and/or components thereof described herein and/or illustrated in the figures can comprise one or more multi-step sequences of, for example, photolithographic and/or chemical processing steps that facilitate gradual creation of electronic-based systems, devices, components, and/or circuits in a semiconducting device (e.g., an integrated circuit). For instance, the various embodiments of integrated circuit device 102 and/or components thereof described herein and/or illustrated in the figures can be fabricated by employing techniques including, but not limited to: photolithography, microlithography, nanolithography, nanoimprint lithography, photomasking techniques, patterning techniques, photoresist techniques (e.g., positive-tone photoresist, negative-tone photoresist, hybrid-tone photoresist, etc.), etching techniques (e.g., reactive ion etching (RIE), dry etching, wet etching, ion beam etching, plasma etching, laser ablation, etc.), evaporation techniques, sputtering techniques, plasma ashing techniques, thermal treatments (e.g., rapid thermal anneal, furnace anneals, thermal oxidation, etc.), physical vapor deposition (PVD), chemical vapor deposition (CVD), atomic layer deposition (ALD), plasma enhanced chemical vapor deposition (PECVD), chemical solution deposition, electroplating, molecular beam epitaxy (MBE), electrochemical deposition (ECD), lift-off techniques, chemical-mechanical planarization (CMP), backgrinding techniques, and/or another technique for fabricating an integrated circuit.

In some embodiments, fabrication of the various embodiments of integrated circuit device 102 and/or components thereof described herein and/or illustrated in the figures can be fabricated using various materials. For example, the various embodiments of integrated circuit device 102 and/or components thereof described herein and/or illustrated in the figures can be fabricated using materials of one or more different material classes including, but not limited to: conductive materials, semiconducting materials, superconducting materials, dielectric materials, polymer materials, organic materials, inorganic materials, non-conductive materials, and/or another material that can be utilized with one or more of the techniques described above for fabricating an integrated circuit.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100, integrated circuit device 102, and/or components thereof can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

As referenced herein, components that can be "electrically" coupled can be coupled via electrical circuitry. For example, the terms "electrical circuitry," "electronic circuitry," "electric circuitry," "circuitry," and/or the like, utilized herein to describe components that can be "electrically" coupled can refer to coupling such components via one or more electronic components (e.g., resistors, transistors, capacitors, inductors, diodes, etc.) that are interconnected by conductive wires and/or traces through which electric current can flow (e.g., alternating current and/or direct current). As employed herein, the terms "electrical circuitry," "electronic circuitry," "electric circuitry," "circuitry," and/or the like, can describe one or more electric circuits that can facilitate various operations (e.g., transferring, storing, and/or altering electrical current, electrical signals, and/or electrical data) of system 100, integrated circuit device 102, components thereof, and/or components coupled therewith.

According to multiple embodiments, processor 104 can comprise one or more types of processors and/or electronic circuitry that can be integrated into integrated circuit device 102 (e.g., via one or more semiconductor fabrication processes as described above). For example, processor 104 can comprise one or more microprocessor (e.g., a programmable general-purpose microprocessor), central processing unit (CPU), multi-core processor, dual microprocessors, microcontroller, System on a Chip (SOC), array processor, vector processor, and/or another type of processor. Further examples of processor 104 are described below with reference to processing unit 814 and FIG. 8. Such examples of processor 104 can be employed to implement any embodiments of the subject disclosure. In some embodiments, processor 104 can implement one or more computer and/or machine readable, writable, and/or executable components and/or instructions that can be stored on a memory (e.g., memory 106). For example, processor 104 can perform various operations that can be specified by such computer and/or machine readable, writable, and/or executable components and/or instructions including, but not limited to, logic, control, input/output (I/O), arithmetic, and/or the like.

Figure 3:
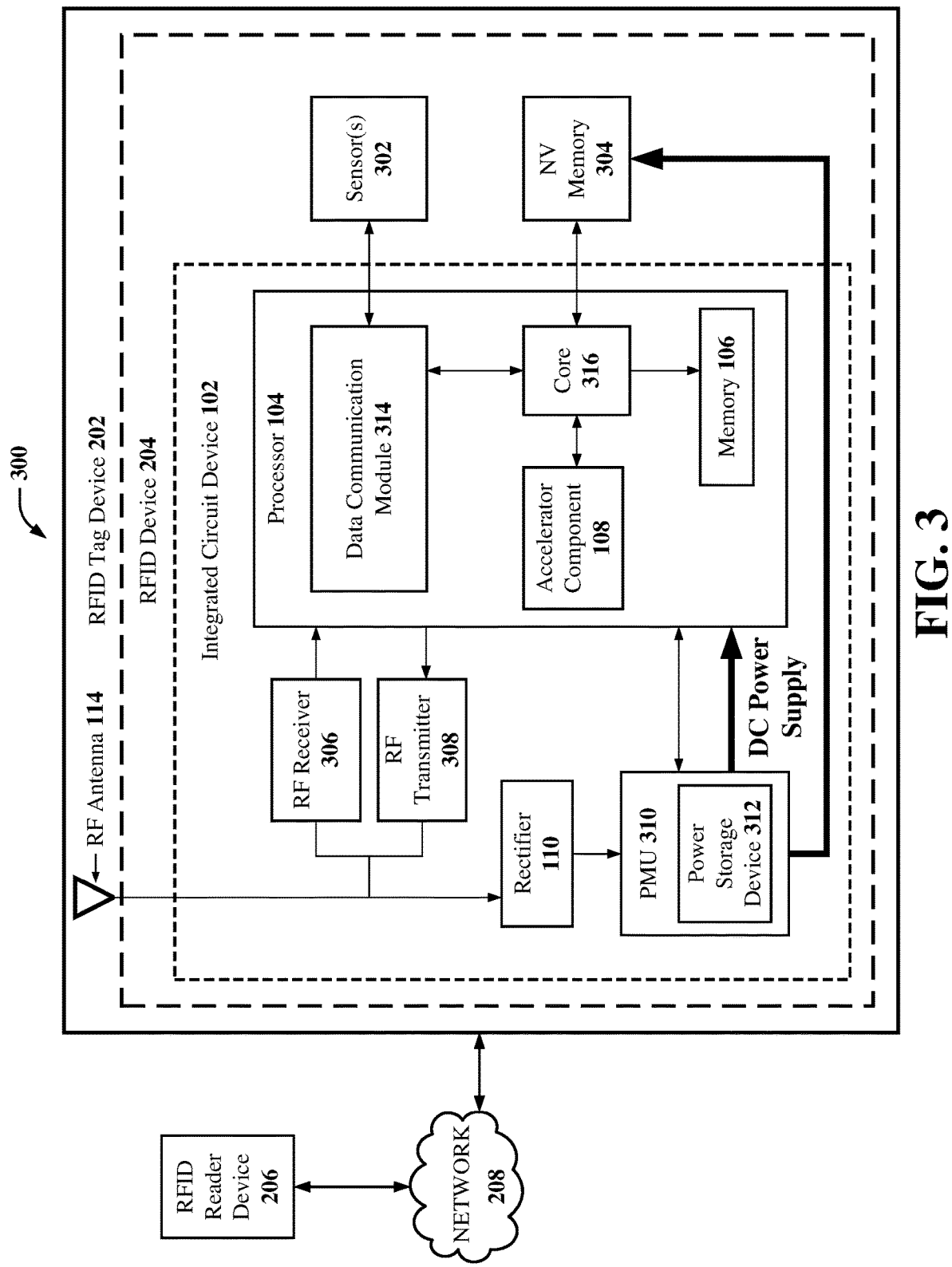
FIG. 3 illustrates a block diagram of an example, non-limiting system that can facilitate radio frequency identification components in accordance with one or more embodiments described herein.
Figure 4:
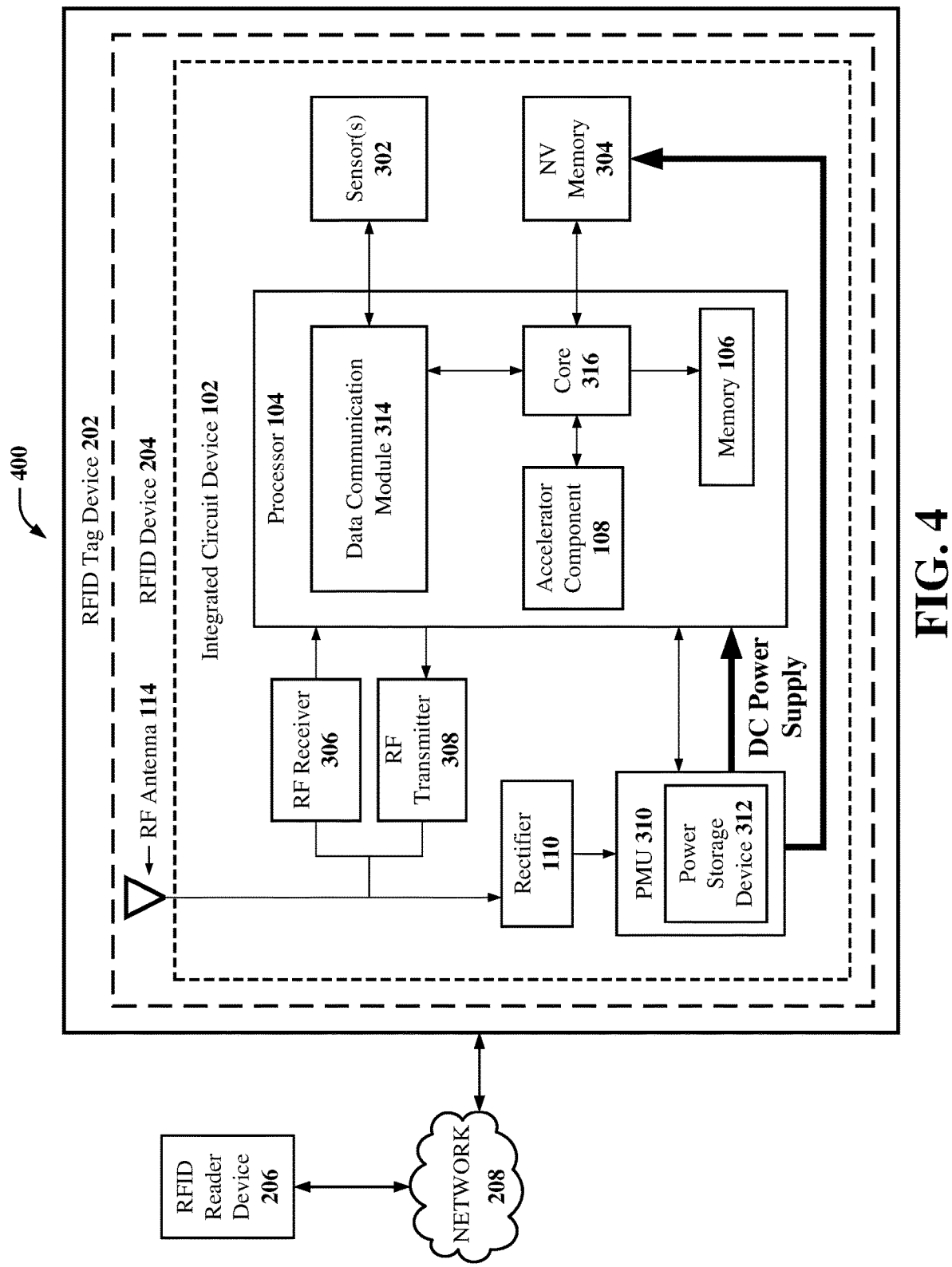
FIG. 4 illustrates a block diagram of an example, non-limiting system that can facilitate radio frequency identification components in accordance with one or more embodiments described herein.
Figure 5:
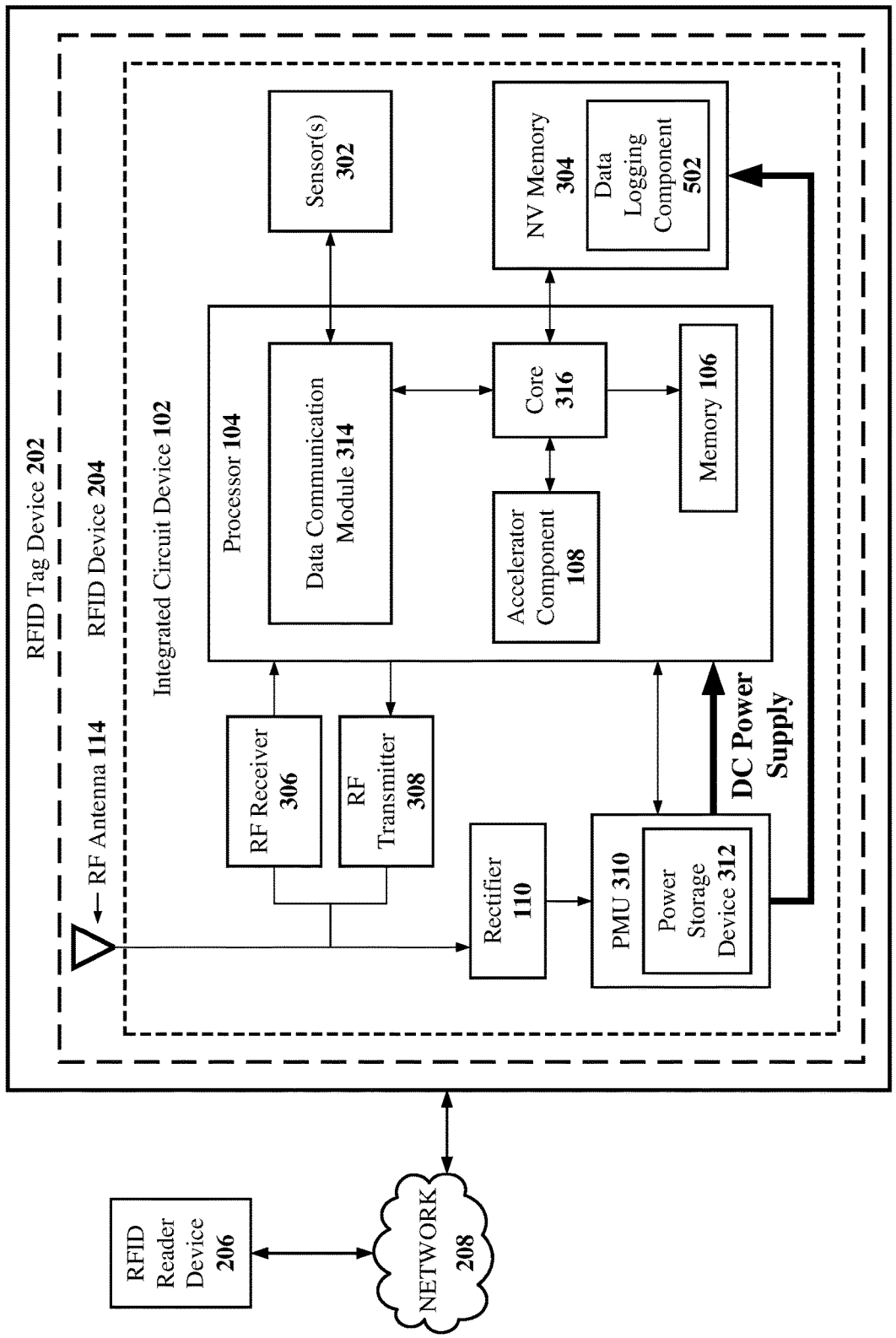
FIG. 5 illustrates a block diagram of an example, non-limiting system that can facilitate radio frequency identification components in accordance with one or more embodiments described herein.

In some embodiments, processor 104 (e.g., the uncore of processor 104) can comprise one or more hardware accelerators (e.g., accelerator component 108 as illustrated in FIGS. 3, 4, and 5) that can optimize system size (e.g., via reducing footprint) and/or power consumption of integrated circuit device 102. In some embodiments, processor 104 can comprise a processor bootloader (not illustrated in FIG. 1) that can support multiple boot up modes to facilitate re-programmability of software that can be stored on a memory (e.g., non-volatile memory 304 described below with reference to FIG. 3), where such re-programmability of such software can support various types of applications (e.g., applications that can enable optimized use of integrated circuit device 102).

According to multiple embodiments, memory 106 can comprise one or more types of memory and/or electronic circuitry that can be integrated into integrated circuit device 102 (e.g., via one or more semiconductor fabrication processes as described above). For example, memory 106 can comprise a cache memory. For example, memory 106 can comprise a central processing unit (CPU) cache, an instruction cache, a data cache, a translation lookaside buffer (TLB), and/or another cache memory. In some embodiments, memory 106 can store one or more computer and/or machine readable, writable, and/or executable components and/or instructions that, when executed by processor 104, can facilitate performance of operations defined by the executable component(s) and/or instruction(s). For example, memory 106 can store computer and/or machine readable, writable, and/or executable components and/or instructions that, when executed by processor 104, can facilitate execution of the various functions described herein relating to integrated circuit device 102, accelerator component 108, data modulator-demodulator 110, rectifier 112, and/or another component associated with integrated circuit device 102, as described herein with or without reference to the various figures of the subject disclosure.

In some embodiments, integrated circuit device 102, processor 104, memory 106, accelerator component 108, data modulator-demodulator 110, rectifier 112, radio frequency (RF) antenna 114, and/or another component of integrated circuit device 102 as described herein can be communicatively, electrically, and/or operatively coupled to one another via electronic circuitry (e.g., as defined above) and/or a bus (not illustrated in FIG. 1) to perform functions of system 100, integrated circuit device 102, and/or any components coupled therewith. In several embodiments, such a bus can be integrated into integrated circuit device 102 (e.g., via one or more semiconductor fabrication processes as described above). For example, such a bus can comprise one or more multi-point interface (MPI) bus, quad serial peripheral interface (QSPI) bus, memory bus, memory controller, peripheral bus, external bus, local bus, and/or another type of bus that can employ various bus architectures. Further examples of such a bus are described below with reference to system bus 818 and FIG. 8, where such examples can be employed to implement any embodiments of the subject disclosure.

In some embodiments, integrated circuit device 102 can comprise any type of component, machine, device, facility, apparatus, and/or instrument that comprises a processor and/or can be capable of effective and/or operative communication with a wired and/or wireless network. All such embodiments are envisioned. For example, integrated circuit device 102 can comprise a System on a Chip (SOC) device, a computing device, a general-purpose computer, a special-purpose computer, a tablet computing device, a handheld device, a laptop computer, a notebook computer, a desktop computer, a cell phone, a smart phone, a consumer appliance and/or instrumentation, an industrial and/or commercial device, a digital assistant, a multimedia Internet enabled phone, a multimedia player, and/or another type of device.

In some embodiments, integrated circuit device 102 can be coupled (e.g., communicatively, electrically, operatively, etc.) to one or more external systems, sources, and/or devices (e.g., computing devices, communication devices, etc.) via a data cable (e.g., High-Definition Multimedia Interface (HDMI), recommended standard (RS) 232, Ethernet cable, etc.). In some embodiments, integrated circuit device 102 can be coupled (e.g., communicatively, electrically, operatively, etc.) to one or more external systems, sources, and/or devices (e.g., computing devices, communication devices, etc.) via a network (e.g., network 208 as described below with reference to FIG. 2).

According to multiple embodiments, such a network (e.g., network 208) can comprise wired and wireless networks, including, but not limited to, a cellular network, a wide area network (WAN) (e.g., the Internet) or a local area network (LAN). For example, integrated circuit device 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, integrated circuit device 102 can thus include hardware (e.g., a central processing unit (CPU), a transceiver, a decoder), software (e.g., a set of threads, a set of processes, software in execution) or a combination of hardware and software that facilitates communicating information between integrated circuit device 102 and external systems, sources, and/or devices (e.g., computing devices, communication devices, etc.).

According to multiple embodiments, accelerator component 108 can comprise any type of accelerator hardware and/or electronic circuitry that can be integrated into integrated circuit device 102 (e.g., via one or more semiconductor fabrication processes as described above). For example, accelerator component 108 can comprise computer hardware including, but not limited to, special-purpose hardware, application-specific hardware, acceleration hardware, security acceleration hardware, and/or another type of accelerator hardware. In some embodiments, accelerator component 108 can perform certain functions more quickly and/or more efficiently than processor 104. For example, such certain functions can include, but are not limited to, data processing, data transformation, execution of routines (e.g., computer and/or machine readable, writable, and/or executable components and/or instructions), computations, and/or another function.

In some embodiments, accelerator component 108 can execute a cryptographic module (e.g., cryptographic routine, cryptographic application, cryptographic software, cryptographic standard, etc.). For example, accelerator component 108 can execute a cryptographic module including, but not limited to, an encryption module, a decryption module, a hashing module, a secure hash algorithm (SHA) module, an advanced encryption standard (AES) module, an elliptic curve digital signature algorithm (ECDSA) public key module, and/or another cryptographic module. In some embodiments, accelerator component 108 can execute one or more secure hash algorithms (SHA) such as, for example, SHA256 advanced encryption standard (AES). In some embodiments, accelerator component 108 can execute one or more elliptic curve digital signature algorithm (ECDSA) such as, for example, ECDSA public key encryption and/or decryption. In some embodiments, accelerator component 108 can execute one or more cryptographic modules described above to facilitate improved processing performance and/or reduced power consumption associated with processor 104, as accelerator component 108 can execute such cryptographic module(s) more quickly and/or more efficiently than processor 104.

In some embodiments, accelerator component 108 can execute one or more such cryptographic modules described above to perform one or more cryptographic functions associated with data received by, transmitted by, pertaining to, and/or captured by (e.g., via one or more sensors) integrated circuit device 102. For example, based on integrated circuit device 102 and/or processor 104 receiving a data communication signal (e.g., via radio frequency (RF) antenna 114 and/or data modulator-demodulator 110 as described below), accelerator component 108 can execute one or more such cryptographic modules described above to decrypt encrypted data in such data communication signal. In another example, based on integrated circuit device 102 and/or processor 104 preparing to transmit a data communication signal (e.g., via radio frequency (RF) antenna 114 and/or data modulator-demodulator 110 as described below), accelerator component 108 can execute one or more such cryptographic modules described above to encrypt data of such data communication signal. In another example, based on integrated circuit device 102 and/or processor 104 receiving sensor data (e.g., sensor data captured by one or more sensors that can be coupled to integrated circuit device 102 and/or processor 104, for example, as described below with reference to sensors 302 and FIG. 3), accelerator component 108 can execute one or more such cryptographic modules described above to perform one or more sensor data preprocessing functions associated with such sensor data (e.g., encrypting the sensor data). In another example, based on integrated circuit device 102 and/or processor 104 receiving information pertaining to integrated circuit device 102 and/or one or more components thereof (e.g., access history data, critical function data, status data, etc.), accelerator component 108 can execute one or more such cryptographic modules described above to encrypt such data.

According to multiple embodiments, data modulator-demodulator 110 can comprise any type of data modulator-demodulator device and/or electronic circuitry that can be integrated into integrated circuit device 102 (e.g., via one or more semiconductor fabrication processes as described above) and can facilitate modulation and/or demodulation functions. For example, data modulator-demodulator 110 can comprise a modulator, a demodulator, a modem, a radio frequency transmitter, a radio frequency receiver, a radio frequency transceiver and/or another type of data modulator-demodulator device.

In some embodiments, data modulator-demodulator 110 can modulate a signal (e.g., a data communication signal, radio frequency signal, etc.) that can be transmitted by integrated circuit device 102. For example, data modulator-demodulator 110 can modify one or more properties (e.g., frequency, amplitude, etc.) of a carrier signal (e.g., a carrier wave, a periodic waveform, a radio wave, etc.) such that the carrier signal can carry information (e.g., a data signal) transmitted by integrated circuit device 102 via a transmitter and/or radio frequency (RF) antenna 114. In some embodiments, data modulator-demodulator 110 can demodulate a signal (e.g., a data communication signal, radio frequency signal, etc.) that can be received by integrated circuit device 102. For example, data modulator-demodulator 110 can extract an original information-bearing signal (e.g., data signal) from a carrier signal (e.g., a carrier wave, a periodic waveform, a radio wave, etc.) that can be received by integrated circuit device 102 via a receiver and/or radio frequency (RF) antenna 114.

According to multiple embodiments, rectifier 112 can comprise any type of rectifier device and/or electronic circuitry that can be integrated into integrated circuit device 102 (e.g., via one or more semiconductor fabrication processes as described above) that can facilitate converting an alternating electric current to a direct electric current. For example, rectifier 112 can comprise a rectifier device and/or an electrical circuit that can facilitate converting an alternating current (AC) induced in radio frequency (RF) antenna 114 (e.g., induced via a radio signal intercepted by radio frequency (RF) antenna 114 as described below) to a direct current (DC).

In some embodiments, rectifier 112 can transfer (e.g., via electrical circuitry and/or a bus described above) the direct current to one or more components of integrated circuit device 102 to power and/or charge such components. For example, rectifier 112 can transfer the direct current to processor 104, memory 106, accelerator component 108, and/or data modulator-demodulator 110 to power and/or charge such components.

According to multiple embodiments, radio frequency (RF) antenna 114 can comprise any type of radio frequency (RF) antenna and/or electronic circuitry that can be integrated into integrated circuit device 102 (e.g., via one or more semiconductor fabrication processes as described above). For example, radio frequency (RF) antenna 114 can comprise an integrated RF antenna, a patch antenna, a microstrip antenna, a printed antenna, and/or another RF antenna.

In some embodiments, radio frequency (RF) antenna 114 can facilitate transmitting and/or receiving an RF signal (e.g., a data communication signal, a modulated carrier signal, radio wave signal, etc.). For example, radio frequency (RF) antenna 114 can be coupled (e.g., electrically, communicatively, operatively, etc.) to data modulator-demodulator 110 (e.g., via electrical circuitry defined above) and can facilitate transmitting a modulated RF signal generated by processor 104, accelerator component 108, and/or data modulator-demodulator 110. In another example, radio frequency (RF) antenna 114 can be coupled (e.g., electrically, communicatively, operatively, etc.) to data modulator-demodulator 110 (e.g., via electrical circuitry defined above) and radio frequency (RF) antenna 114 can facilitate receiving a modulated RF signal transmitted by an external computing device (e.g., a remote computing device as described below with reference to FIG. 2).

In some embodiments, radio frequency (RF) antenna 114 can comprise an energy harvesting component that can harvest ambient energy to power and/or charge one or more components of integrated circuit device 102. For example, radio frequency (RF) antenna 114 can comprise a radio frequency antenna that can intercept ambient radio waves propagating through the atmosphere to capture electromagnetic radiant energy (e.g., radio waves transmitted by an external device such as, for example, radio frequency identification (RFID) reader device 206 described below with reference to FIG. 2). For instance, oscillating transverse magnetic and electric fields inherent to such ambient radio waves can apply oscillating forces on electrons in atoms of the material of radio frequency (RF) antenna 114, thereby producing an alternating electric current in such material of radio frequency (RF) antenna 114 (e.g., according to Faraday's law of induction). In some embodiments, radio frequency (RF) antenna 114 can be electrically coupled (e.g., via electrical circuitry defined above) to rectifier 112, which can convert the alternating electric current to direct electric current and transfer such direct electric current to one or more components of integrated circuit device 102 to power and/or charge such components (e.g., as described above).

Additionally, or alternatively, in some embodiments, integrated circuit device 102 can comprise one or more other energy harvesting components (e.g., energy harvesting components other than radio frequency (RF) antenna 114 that are not depicted in the figures). For example, integrated circuit device 102 can comprise energy harvesting components including, but not limited to, one or more photovoltaic cell (e.g., a solar cell), thermo-generator (e.g., a thermoelectric generator), microgenerator, ultrasonic transducer, piezoelectric generator, and/or another energy harvesting component that can harvest energy from one or more external energy sources. In some embodiments, integrated circuit device 102 can comprise any of the energy harvesting component examples listed above and/or any combination thereof. In some embodiments, such energy harvesting components can harvest energy from external energy sources including, but not limited to, magnetic energy, electric energy, electromagnetic radiant energy, solar energy, ultrasonic energy, thermal energy, kinetic energy, wind energy, light energy, ambient energy, and/or another external energy source.

In some embodiments, such energy harvesting components can harvest various types of energy and convert the energy to electrical energy (e.g., a direct electrical current or voltage). For example, integrated circuit device 102 can comprise one or more photovoltaic cells (e.g., solar cells) that can absorb light (e.g., sunlight and/or artificial light, such as light produced by a Light-Emitting Diode (LED), etc.) and convert the energy in the light to electrical energy (e.g., via the photovoltaic effect). For instance, the light energy absorbed by a solar cell can excite electrons in the solar cell material to a higher-energy state, thereby creating an electric potential (e.g., a voltage) in atoms of the solar cell material, which the solar cell can convert to a direct electrical current. In some embodiments, integrated circuit device 102 can comprise one or more thermoelectric-generators that can convert thermal energy (e.g., energy stored in heated gas, liquid, solids, etc.) to electric energy (e.g., via the Seebeck effect, the thermoelectric effect, etc.). In some embodiments, integrated circuit device 102 can comprise one or more microgenerators that can covert kinetic energy (e.g., vibrations, human movement, etc.) to electric energy (e.g., via transferring the kinetic energy to an electric generator which causes the kinetic energy to induce an electrical current in a circuit, according to Faraday's law of induction).

In some embodiments, such energy harvesting components can be coupled (e.g., electrically, communicatively, operatively, etc.) to one or more components of integrated circuit device 102 (e.g., via a bus and/or electrical circuitry as defined above). In these embodiments, such energy harvesting components can transfer such converted electric energy described above (e.g., direct electrical current or voltage) to one or more components of integrated circuit device 102 to power and/or charge such components.

In some embodiments, integrated circuit device 102 can comprise one or more other components (not depicted in FIG. 1) that can facilitate one or more operations of the subject disclosure. For example, integrated circuit device 102 can comprise components including, but not limited to, a Benes network (e.g., a multistage circuit-switching network such as, for instance, a Clos network), a radio frequency receiver, a radio frequency transmitter, a radio frequency transceiver, a power storage device, a power management unit, one or more sensors, a non-volatile memory, and/or another component. For instance, integrated circuit device 102 can comprise a Benes network (e.g., 2×2 Benes network, 4×4 Benes network, 8×8 Benes network, etc.) that can enable reading (e.g., via processor 104 and/or accelerator component 108) unique identification information (e.g., encrypted data) of a data communication signal transmitted and/or received by integrated circuit device 102 (e.g., via radio frequency (RF) antenna 114, data modulator-demodulator 110, etc.). In other example embodiments, for instance, as described below with reference to FIGS. 3, 4, and 5, integrated circuit device 102 can comprise one or more of the components described above. For example, integrated circuit device 102 can comprise one or more sensors 302 (FIG. 4), a non-volatile memory 304 (FIG. 4), a radio frequency (RF) receiver 306 (FIG. 3), a radio frequency (RF) transmitter 308 (FIG. 3), a power management unit (PMU) 310 (FIG. 3), a power storage device 312 (FIG. 3), a data communication module 314 (FIG. 3), a core 316 (FIG. 3), a data logging component 502 (FIG. 5), and/or another component.

In some embodiments, integrated circuit device 102 can be implemented in one or more computing devices that can communicate with one or more external computing devices (e.g., remote computing devices). For example, as described below with reference to FIG. 2, integrated circuit device 102 can be implemented in a radio frequency identification (RFID) device (e.g., radio frequency identification (RFID) device 204) that can be implemented in a radio frequency identification (RFID) tag device (e.g., radio frequency identification (RFID) tag device 202), which can communicate with one or more external computing devices (e.g., radio frequency identification (RFID) reader device 206) over a network (e.g., network 208).

In some embodiments, such communication between integrated circuit device 102 and a radio frequency identification (RFID) reader device can be based on execution of one or more cryptographic modules described above by accelerator component 108. For example, based on integrated circuit device 102 and/or processor 104 receiving a data communication signal (e.g., via radio frequency (RF) antenna 114 and/or data modulator-demodulator 110) from a radio frequency identification (RFID) reader device, accelerator component 108 can execute one or more such cryptographic modules described above to perform one or more cryptographic functions associated with such data communication signal (e.g., decryption of the data communication signal). In another example, based on integrated circuit device 102 and/or processor 104 preparing to transmit a data communication signal (e.g., via radio frequency (RF) antenna 114 and/or data modulator-demodulator 110), accelerator component 108 can execute one or more such cryptographic modules described above to perform one or more cryptographic functions associated with such data communication signal (e.g., encryption of the data communication signal). In this example, such data communication signal can comprise sensor data captured by one or more sensors that can be coupled to integrated circuit device 102 and/or processor 104 (e.g., as described below with reference to sensors 302 and FIG. 3), where accelerator component 108 can execute one or more such cryptographic modules described above to encrypt such sensor data that can be transmitted by integrated circuit device 102 to a radio frequency identification (RFID) reader device.

Figure 2:
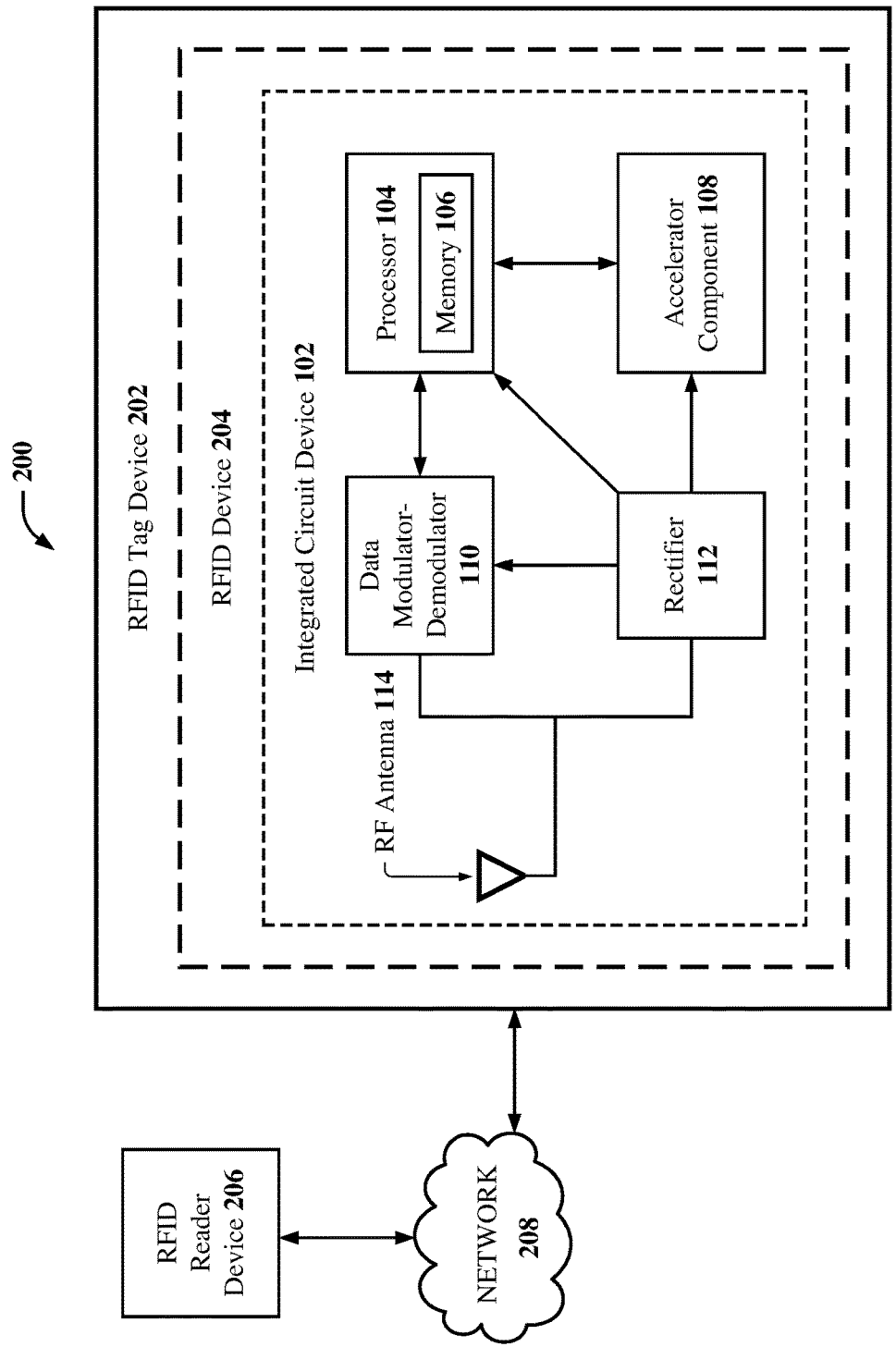
FIG. 2 illustrates a block diagram of an example, non-limiting system that can facilitate radio frequency identification components in accordance with one or more embodiments described herein.

FIG. 2 illustrates a block diagram of an example, non-limiting system 200 that can facilitate radio frequency identification components in accordance with one or more embodiments described herein. Repetitive description of like elements and/or processes employed in various embodiments described herein is omitted for sake of brevity.

In some embodiments, system 200 can comprise an example, non-limiting alternative embodiment of system 100, where system 200 can comprise integrated circuit device 102 implemented in a radio frequency identification (RFID) device 204, which can be implemented in a radio frequency identification (RFID) tag device 202. In some embodiments, radio frequency identification (RFID) tag device 202 can communicate with a radio frequency identification (RFID) reader device 206 over a network 208, where network 208 can comprise any network (e.g., the Internet) described above with reference to FIG. 1.

According to multiple embodiments, radio frequency identification (RFID) tag device 202 can comprise any type of carrier component, machine, device, facility, apparatus, and/or instrument that can comprise (e.g., carry) radio frequency identification (RFID) device 204, integrated circuit device 102, and/or a processor (e.g., processor 104) and/or can be capable of effective and/or operative communication with a wired and/or wireless network. All such embodiments are envisioned. For example, radio frequency identification (RFID) tag device 202 can comprise a carrier device including, but not limited to, an active radio frequency identification (RFID) tag device, a passive radio frequency identification (RFID) tag device, an Internet of Things (IoT) device, a computing device, a general-purpose computer, a special-purpose computer, a tablet computing device, a handheld device, a laptop computer, a notebook computer, a desktop computer, a cell phone, a smart phone, a consumer appliance and/or instrumentation, an industrial and/or commercial device, a digital assistant, a multimedia Internet enabled phone, a multimedia player, and/or another type of carrier device. In some embodiments, radio frequency identification (RFID) tag device 202 can comprise a carrier device that can accommodate multiple chips (e.g., integrated circuits) associated with different technologies and/or additional components (e.g., sensor electrodes, radio frequency antenna, photo-voltaic cells, photo-detectors, decoupling capacitors, etc.).

According to multiple embodiments, radio frequency identification (RFID) device 204 can comprise a packaged embodiment of integrated circuit device 102. For example, radio frequency identification (RFID) device 204 can comprise an integrated circuit package (e.g., a semiconductor package) that can encapsulate integrated circuit device 102 via a supporting case (e.g., metal, glass, plastic, ceramic, etc.) that can protect integrated circuit device 102 from damage (e.g., physical damage, corrosion, etc.). In this example, radio frequency identification (RFID) device 204, which can comprise an integrated circuit package, can further enable coupling (e.g., electrically, communicatively, mechanically, operatively, etc.) of integrated circuit device 102 to one or more components of radio frequency identification (RFID) tag device 202. For instance, radio frequency identification (RFID) device 204 can enable such coupling of one or more electrodes (e.g., contact pads, leads, terminals, pins, wires, solder bumps, etc.) of integrated circuit device 102 to one or more electrodes (e.g., contact pads, leads, terminals, pins, wires, solder bumps, etc.) of a circuit board (e.g., a printed circuit board (PCB)) of radio frequency identification (RFID) tag device 202.

In some embodiments, radio frequency identification (RFID) device 204 can comprise an integrated circuit package including, but not limited to, single in-line package (SIP), dual in-line package (DIP), flat package, quad flat package, chip carrier package, pin-grid array package, through-hold package, surface mount package, small outline package, chip-scale package, ball grid array package, small-pin-count integrated circuit package, multi-chip package, and/or another integrated circuit package. In some embodiments, radio frequency identification (RFID) device 204 can comprise a dense organic packaged embodiment of integrated circuit device 102, where radio frequency identification (RFID) device 204 can comprise, for example, organic material. For instance, radio frequency identification (RFID) device 204 can comprise a dense organic integrated circuit package including, but not limited to, ceramic package, ceramic dual in-line package (CDIP), glass-sealed ceramic dual in-line package, organic pin-grid array (OPGA), ceramic pin-grid array (CPGA), ceramic column-grid array (CGA), ceramic lead-less chip carrier (CLCC), ceramic flat-pack (CFP), ceramic quad flat-pack (CQFP), ceramic ball-grid array (CBGA), organic ball-grid array (OBGA), and/or another dense organic integrated circuit package.

In some embodiments, integrated circuit device 102 can be packaged by (e.g., packaged with and/or packaged within) radio frequency identification (RFID) device 204 using one or more integrated circuit packaging techniques. For example, integrated circuit device 102 can be packaged by (e.g., packaged with and/or packaged within) radio frequency identification (RFID) device 204 using one or more integrated circuit packaging techniques including, but not limited to, integrated circuit bonding (e.g., via wire boding, down bonding, thermosonic bonding, tape-automated bonding, flip chip bonding, tab bonding, quilt packaging, film attaching, spacer attaching, etc.), integrated circuit encapsulation (e.g., via baking, plating, lasermarking, trim and form, etc.), wafer bonding, and/or another integrated circuit packaging technique.

According to multiple embodiments, radio frequency identification (RFID) reader device 206 can comprise any type of component, machine, device, facility, apparatus, and/or instrument that comprises a processor and/or can be capable of effective and/or operative communication with a wired and/or wireless network. All such embodiments are envisioned. For example, radio frequency identification (RFID) reader device 206 can comprise a server device, a computing device, a general-purpose computer, a special-purpose computer, a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

FIG. 3 illustrates a block diagram of an example, non-limiting system 300 that can facilitate radio frequency identification components in accordance with one or more embodiments described herein. Repetitive description of like elements and/or processes employed in various embodiments described herein is omitted for sake of brevity.

In some embodiments, system 300 can comprise an example, non-limiting alternative embodiment of system 200, where system 300 can comprise integrated circuit device 102 implemented in radio frequency identification (RFID) device 204, which can comprise one or more sensors 302 and/or a non-volatile memory 304 and can be implemented in radio frequency identification (RFID) tag device 202. In some embodiments, radio frequency identification (RFID) tag device 202 can further comprise radio frequency (RF) antenna 114 and can communicate with radio frequency identification (RFID) reader device 206 via network 208. In some embodiments, integrated circuit device 102 can comprise a radio frequency (RF) receiver 306, a radio frequency (RF) transmitter 308, and/or a power management unit (PMU) 310, which can comprise a power storage device 312. In some embodiments, processor 104 of integrated circuit device 102 can comprise a data communication module 314 and/or one or more cores 316.

In some embodiments, components of integrated circuit device 102, radio frequency identification (RFID) device 204, and/or radio frequency identification (RFID) tag device 202 can be coupled (e.g., electrically, communicatively, operatively, etc.) to one another via electrical circuitry and/or a bus as described above with reference to FIG. 1. In some embodiments, radio frequency identification (RFID) tag device 202 and/or radio frequency identification (RFID) device 204 can comprise a multibit peripheral interface (MPIO) that can enable 8-bit (Oct rate) serial communication with off-chip memory (e.g., non-volatile memory 304 located off integrated circuit device 102 as depicted in FIGS. 4 and 5), which can facilitate optimized performance of integrated circuit device 102, radio frequency identification (RFID) tag device 202, and/or radio frequency identification (RFID) device 204.

According to multiple embodiments, sensors 302 can comprise one or more sensor devices and/or electronic circuitry that can be integrated into and/or coupled (e.g., electrically, communicatively, operatively, etc.) to integrated circuit device 102, radio frequency identification (RFID) device 204, and/or radio frequency identification (RFID) tag device 202 (e.g., via one or more semiconductor fabrication processes as described above). For example, as depicted in FIG. 3, sensors 302 can be integrated into radio frequency identification (RFID) device 204 and coupled (e.g., electrically via electronic circuitry and/or a bus as described above) to integrated circuit device 102 and/or one or more components thereof (e.g., processor 104, data communication module 314, etc.).

In some embodiments, sensors 302 can capture sensor data. For example, sensors 302 can comprise various types of sensors that can capture various types of data related to, for instance: radio frequency identification (RFID) tag device 202; one or more components of radio frequency identification (RFID) tag device 202 (e.g., integrated circuit device 102, radio frequency identification (RFID) device 204, etc.); an environment surrounding radio frequency identification (RFID) tag device 202; an entity using radio frequency identification (RFID) tag device 202; and/or other sensor data. For instance, sensors 302 can comprise sensors including, but not limited to, temperature sensor, pressure sensor, humidity sensor, motion sensor, velocity sensor, acceleration sensor, heartrate sensor, blood pressure sensor, and/or another sensor.

In some embodiments, accelerator component 108 can execute a cryptographic module to facilitate a cryptographic function related to such sensor data captured by sensors 302. For example, accelerator component 108 can execute one or more cryptographic modules described above with reference to FIG. 1 to encrypt such sensor data captured by one or more sensors 302. In some embodiments, such encrypted sensor data can be stored in a memory (e.g., memory 106, non-volatile memory 304, etc.) of integrated circuit device 102, radio frequency identification (RFID) tag device 202, and/or radio frequency identification (RFID) device 204.

In some embodiments, sensors 302 can comprise sensor analog components having a custom interface with data communication module 314 that can enable calibration and/or analog to digital conversion. In some embodiments, sensors 302 can comprise sensors having feature settings (e.g., range, resolution, sensitivity, etc.) that can be adjustable (e.g., can be adjusted via processor 104 employing software components stored on a memory such as, for example, memory 106, non-volatile memory 304, etc.), thereby facilitating use of small sized sensors that enable a reduced footprint of and/or reduced power consumption by integrated circuit device 102, radio frequency identification (RFID) device 204, and/or radio frequency identification (RFID) tag device 202.

According to multiple embodiments, non-volatile memory 304 can comprise a non-volatile memory device and/or electronic circuitry that can be integrated into and/or coupled (e.g., electrically, communicatively, operatively, etc.) to integrated circuit device 102, radio frequency identification (RFID) device 204, and/or radio frequency identification (RFID) tag device 202 (e.g., via one or more semiconductor fabrication processes as described above). For example, as depicted in FIG. 3, non-volatile memory 304 can be integrated into radio frequency identification (RFID) device 204 and coupled (e.g., electrically via electronic circuitry and/or a bus as described above) to integrated circuit device 102 and/or one or more components thereof (e.g., processor 104, core 316, etc.). In some embodiments, non-volatile memory 304 can comprise a certain memory interface that can facilitate optimized performance and/or power consumption using multibit peripheral interface (MPIO) that allows 8-bit (Oct rate) serial communication.

In some embodiments, non-volatile memory 304 can store one or more computer and/or machine readable, writable, and/or executable components and/or instructions that, when executed by processor 104, can facilitate performance of operations defined by the executable component(s) and/or instruction(s). For example, non-volatile memory 304 can store computer and/or machine readable, writable, and/or executable components and/or instructions that, when executed by processor 104, can facilitate execution of the various functions described herein relating to accelerator component 108, sensors 302, radio frequency (RF) receiver 306, radio frequency (RF) transmitter 308, power management unit (PMU) 310, power storage device 312, data communication module 314, core 316, and/or another component associated with integrated circuit device 102, radio frequency identification (RFID) tag device 202, and/or radio frequency identification (RFID) device 204, as described herein with or without reference to the various figures of the subject disclosure. In some embodiments, non-volatile memory 304 can store sensor data captured by sensors 302 and/or sensor data encrypted by accelerator component 108 (e.g., via executing one or more cryptographic modules described above).

In some embodiments, non-volatile memory 304 can comprise non-volatile memory (e.g., random-access memory (RAM), magnetoresistive random access memory (MRAM), phase-change memory (PCM), static random-access memory (SRAM), read only memory (ROM), programmable ROM (PROM), electrically programmable ROM (EPROM), electrically erasable programmable ROM (EEPROM), etc.) that can employ one or more memory architectures. Further examples of non-volatile memory 304 are described below with reference to system memory 816 and FIG. 8. Such examples of non-volatile memory 304 can be employed to implement any embodiments of the subject disclosure. In some embodiments, non-volatile memory 304 can comprise static random access memory (SRAM) having a defined size, a certain array architecture, and/or one or more certain types of transistors that can facilitate maximizing performance of integrated circuit device 102, radio frequency identification (RFID) tag device 202, and/or radio frequency identification (RFID) device 204 while minimizing standby power of such components.

According to multiple embodiments, radio frequency (RF) receiver 306 can comprise a radio frequency (RF) receiver device and/or electronic circuitry that can be integrated into integrated circuit device 102 (e.g., via one or more semiconductor fabrication processes as described above). For example, radio frequency (RF) receiver 306 can comprise a radio frequency (RF) receiver device that can receive radio waves carrying data (e.g., data communication signals received via radio frequency (RF) antenna 114) and convert information carried in such radio waves (e.g., via electronic filters, demodulation, etc.) to a usable form (e.g., electronic signals representing data that can be processed by processor 104 and/or data communication module 314 as described above with reference to data modulator-demodulator 110 and FIG. 1). In some embodiments, for example, as described above with reference to FIG. 1, accelerator component 108 can execute one or more cryptographic modules to facilitate one or more cryptographic functions related to such data received by radio frequency (RF) receiver 306 (e.g., to decrypt encrypted data signals).

According to multiple embodiments, radio frequency (RF) transmitter 308 can comprise a radio frequency (RF) transmitter device and/or electronic circuitry that can be integrated into integrated circuit device 102 (e.g., via one or more semiconductor fabrication processes as described above). For example, radio frequency (RF) transmitter 308 can comprise a radio frequency (RF) transmitter device that can generate radio waves carrying data (e.g., data communication signals that can be generated by processor 104, accelerator component 108, and/or data communication module 314). For instance, radio frequency (RF) transmitter 308 can generate radio waves carrying data (e.g., via modulation) that can be transmitted to an external computing device (e.g., radio frequency identification (RFID) reader device 206) via radio frequency (RF) antenna 114 and/or network 208. In some embodiments, for example, as described above with reference to FIG. 1, accelerator component 108 can execute one or more cryptographic modules to facilitate one or more cryptographic functions related to such data transmitted by radio frequency (RF) transmitter 308 (e.g., to encrypt such data).

According to multiple embodiments, power management unit (PMU) 310 can comprise a power management unit (PMU) device and/or electronic circuitry that can be integrated into integrated circuit device 102 (e.g., via one or more semiconductor fabrication processes as described above) and can govern one or more power functions of one or more components of integrated circuit device 102, radio frequency identification (RFID) tag device 202, and/or radio frequency identification (RFID) device 204. For example, power management unit (PMU) 310 can comprise a microcontroller.

In some embodiments, to facilitate such governing of or more power functions of one or more components described above, non-volatile memory 304 can comprise one or more computer and/or machine executable components and/or instructions that, when executed (e.g., by processor 104 and/or power management unit (PMU) 310), can cause power management unit (PMU) 310 to perform one or more operations that can facilitate such governing one or more power functions of such one or more components. For instance, power management unit (PMU) 310 can govern one or more power functions by performing operations including, but not limited to: charging components when necessary (e.g., a battery and/or capacitor constituting power storage device 312, processor 104, non-volatile memory 304, etc.); monitoring power connections and components' charge (e.g., a charge of power storage device 312, processor 104, non-volatile memory 304, etc.); controlling power to components (e.g., processor 104, non-volatile memory 304, etc.); shutting down components when they are idle; controlling sleep and/or power functions (e.g., on and off); regulating a real-time clock (RTC) of integrated circuit device 102, radio frequency identification (RFID) tag device 202, and/or radio frequency identification (RFID) device 204; and/or another power function.

In some embodiments, rectifier 112, radio frequency (RF) antenna 114, radio frequency (RF) receiver 306, radio frequency (RF) transmitter 308, power management unit (PMU) 310, and/or power storage device 312 can constitute an analog power and communication circuit. In these embodiments, such an analog power and communication circuit can generate power supply, clock signals, and/or input-output communication signals. In these embodiments, such an analog power and communication circuit can be optimized to enable integrated operation with a core of processor 104 (e.g., core 316) and/or communication modules (e.g., data communication module 314), thereby allowing for automatic power management functions, auto-calibration, drift tracking, and/or performance optimization.

In some embodiments, power storage device 312 can comprise an electrical energy storage device and/or electrical circuitry that can be integrated into integrated circuit device 102 (e.g., via one or more semiconductor fabrication processes as described above) and can store electrical current or voltage. For example, power storage device 312 can comprise an electrical energy storage device including, but not limited to, a battery, a capacitor, and/or another electrical energy storage device.

In some embodiments, power storage device 312 can store electrical energy (e.g., via storing direct current or voltage in a battery, a capacitor, etc.) received from rectifier 112. For example, power storage device 312 can store such electrical energy (e.g., direct current or voltage) in a capacitor and/or a battery (e.g., thin-film battery, solid state battery, thin-film solid state battery, microbattery, etc.) constituting power storage device 312. In some embodiments, power storage device 312 (e.g., via power management unit 310) can discharge and/or transfer (e.g., via a bus and/or electrical circuitry described above) the stored electric energy to one or more components of integrated circuit device 102, radio frequency identification (RFID) tag device 202, and/or radio frequency identification (RFID) device 204 (e.g., processor 104, non-volatile memory 304, etc.) to power and/or charge such components.

According to multiple embodiments, data communication module 314 can comprise a data communication module device and/or electronic circuitry that can be integrated into integrated circuit device 102 and/or processor 104 (e.g., via one or more semiconductor fabrication processes as described above) and can manage the data communication input and/or output processing of processor 104. For example, data communication module 314 can comprise a data communication module device including, but not limited to, a communications processor, communication controller, front-end processor, and/or another data communication module device that can manage the processing of data communications input to and/or output from processor 104.

In some embodiments, to facilitate such management of data communication input and/or output processing, non-volatile memory 304 can comprise one or more computer and/or machine executable components and/or instructions that, when executed (e.g., by processor 104 and/or data communication module 314), can cause data communication module 314 to perform one or more data communication operations that can facilitate such management of data communication input and/or output processing. In some embodiments, to facilitate such management of data communication input and/or output processing, data communication module 314 can implement a communication protocol that can optimize communication speed while adjusting sampling and/or calibration based on clock stability and/or component signal drift.

In some embodiments, data communication module 314 can manage data communication input and/or output processing related to data communication signals received and/or transmitted by integrated circuit device 102, radio frequency identification (RFID) tag device 202, and/or radio frequency identification (RFID) device 204. For example, data communication module 314 can facilitate one or more cryptographic functions associated with such data communication signals by, for instance, employing accelerator component 108 to execute one or more cryptographic modules described above with reference to FIG. 1 to encrypt and/or decrypt information in such data communication signals.

In some embodiments, data communication module 314 can manage data communication input and/or output processing related to sensor data captured by sensors 302. For example, based on receiving sensor data from sensors 302, data communication module 314 can employ accelerator component 108 to execute one or more cryptographic modules described above with reference to FIG. 1 to encrypt such sensor data and/or store such encrypted sensor data in a memory (e.g., memory 106, non-volatile memory 304, etc.).

According to multiple embodiments, core 316 can comprise a core device and/or electronic circuitry that can be integrated into integrated circuit device 102 and/or processor 104 (e.g., via one or more semiconductor fabrication processes as described above) and can facilitate reading, writing, and/or executing computer and/or machine readable, writable, and/or executable components and/or instructions. For example, core 316 can comprise a single core of a multi-core microprocessor that can constitute processor 104. In another example, core 316 can comprise a reduced instruction set computer (RISC) comprising an instruction set architecture (ISA) that can enable fewer cycles per instruction (CPI) compared to a complex instruction set computer (CISC).

In some embodiments, core 316 can be coupled (e.g., electrically, communicatively, operatively, etc.) to memory 106, accelerator component 108, and/or non-volatile memory 304 (e.g., via a bus and/or electrical circuitry described above). In these embodiments, core 316 can facilitate reading, writing, and/or executing, by accelerator component 108, one or more cryptographic modules that can be stored on non-volatile memory 304. In some embodiments, core 316 and/or processor 104 can support a generic RISC instruction set with a low power circuit implementation.

In some embodiments, radio frequency identification (RFID) tag device 202 and/or radio frequency identification (RFID) device 204 can comprise one or more energy harvesting components (e.g., energy harvesting components other than radio frequency (RF) antenna 114 that are not depicted in the figures). For example, radio frequency identification (RFID) tag device 202 and/or radio frequency identification (RFID) device 204 can comprise one or more energy harvesting components described above with reference to integrated circuit device 102 and FIG. 1 (e.g., photovoltaic cell, thermo-generator, thermoelectric generator, microgenerator, ultrasonic transducer, piezoelectric generator, etc.).

FIG. 4 illustrates a block diagram of an example, non-limiting system 400 that can facilitate radio frequency identification components in accordance with one or more embodiments described herein. Repetitive description of like elements and/or processes employed in various embodiments described herein is omitted for sake of brevity.

In some embodiments, system 400 can comprise an example, non-limiting alternative embodiment of system 300, where integrated circuit device 102 of system 400 (e.g., instead of radio frequency identification (RFID) device 204 of system 300) can comprise one or more sensors 302 and/or a non-volatile memory 304. In such embodiments, radio frequency identification (RFID) device 204 of system 400 (e.g., instead of radio frequency identification (RFID) tag device 202 of system 300) can comprise radio frequency (RF) antenna 114.

FIG. 5 illustrates a block diagram of an example, non-limiting system 500 that can facilitate radio frequency identification components in accordance with one or more embodiments described herein. Repetitive description of like elements and/or processes employed in various embodiments described herein is omitted for sake of brevity.

In some embodiments, system 500 can comprise an example, non-limiting alternative embodiment of system 400, where non-volatile memory 304 can comprise a data logging component 502. According to multiple embodiments, data logging component 502 can record secured data. For example, data logging component 502 can record secured data including, but not limited to, secured communication data, secured sensor data, secured access history data, secured critical function data, and/or another type of secured data. In some embodiments, data logging component 502 can record such secured data in a memory (e.g., memory 106, non-volatile memory 304, etc.). For instance, data logging component 502 can record such secured data in an index file stored on such a memory (e.g., memory 106, non-volatile memory 304, etc.). In some embodiments, to facilitate recording secured data, data logging component 502 can build and/or maintain data logs (e.g., compressed or uncompressed) to record such secured data, where such data logs can be stored on a memory (e.g., memory 106, non-volatile memory 304, etc.).

In some embodiments, data logging component 502 can record decrypted data of data communication signals received by integrated circuit device 102, radio frequency identification (RFID) tag device 202, and/or radio frequency identification (RFID) device 204 communication data. In some embodiments, data logging component 502 can record encrypted data of data communication signals transmitted by integrated circuit device 102, radio frequency identification (RFID) tag device 202, and/or radio frequency identification (RFID) device 204 communication data. In some embodiments, data logging component 502 can record sensor data captured by sensors 302 and encrypted by accelerator component 108 (e.g., via executing one or more cryptographic modules described above). In some embodiments, data logging component 502 can record access history data (e.g., data pertaining to access history of integrated circuit device 102, radio frequency identification (RFID) tag device 202, radio frequency identification (RFID) device 204, and/or components thereof) that can be encrypted by accelerator component 108 (e.g., via executing one or more cryptographic modules described above). In some embodiments, data logging component 502 can record critical function data (e.g., data pertaining to critical functions of and/or status of integrated circuit device 102, radio frequency identification (RFID) tag device 202, radio frequency identification (RFID) device 204, and/or components thereof) that can be encrypted by accelerator component 108 (e.g., via executing one or more cryptographic modules described above).

In some embodiments, the subject disclosure (e.g., radio frequency identification (RFID) tag device 202, radio frequency identification (RFID) device 204, and/or integrated circuit device 102), can be radio frequency identification system and/or process associated with various technologies. For example, the subject disclosure (e.g., radio frequency identification (RFID) tag device 202, radio frequency identification (RFID) device 204, and/or integrated circuit device 102) can be associated with radio frequency identification technologies, radio frequency identification tag device technologies, radio frequency identification reader device technologies, data cryptography technologies, communication signal cryptography technologies, Internet of Things (IoT) device technologies, cloud computing technologies, computer technologies, server technologies, machine learning technologies, artificial intelligence technologies, computer hardware technologies, integrated circuit technologies, semiconductor device fabrication technologies, and/or other technologies.

In some embodiments, the subject disclosure (e.g., radio frequency identification (RFID) tag device 202, radio frequency identification (RFID) device 204, and/or integrated circuit device 102) can provide technical improvements to systems, devices, components, operational steps, and/or processing steps associated with the various technologies identified above. For example, the subject disclosure (e.g., radio frequency identification (RFID) tag device 202, radio frequency identification (RFID) device 204, and/or integrated circuit device 102) can facilitate implementation of sophisticated algorithms on "standard" IoT microprocessors (e.g., digital signature algorithms such as, for instance, one or more cryptographic modules described above with reference to FIG. 1). For instance, the subject disclosure (e.g., radio frequency identification (RFID) tag device 202, radio frequency identification (RFID) device 204, and/or integrated circuit device 102) can employ accelerator component 108 to execute such algorithms In this example, the subject disclosure (e.g., radio frequency identification (RFID) tag device 202, radio frequency identification (RFID) device 204, and/or integrated circuit device 102) and/or accelerator component 108 can clock at higher frequencies within a given power envelope, which can enable practical execution of such complex algorithms (e.g., complex digital encryption signature algorithms) in various radio frequency identification tag devices and/or IoT devices.

In some embodiments, the subject disclosure (e.g., radio frequency identification (RFID) tag device 202, radio frequency identification (RFID) device 204, and/or integrated circuit device 102) can provide technical improvements to a processing unit (e.g., processor 104) associated with one or more devices of a radio frequency identification system (e.g., RFID tag devices, IoT devices, etc.). For example, integrated circuit device 102 can provide improved processing performance and/or reduced power consumption associated with such a processing unit (e.g., processor 104). For instance, by employing accelerator component 108 to execute one or more cryptographic modules (e.g., described above with reference to FIG. 1), a processing workload of processor 104 can be reduced, thereby reducing processing time to execute such a workload, which can improve processing performance of processor 104 and/or reduce power consumed by processor 104. In another example, by integrating processor 104 and accelerator component 108 on the same integrated circuit (e.g., integrated circuit device 102), less energy can be lost due to components of one integrated circuit (e.g., a processor) communicating and/or interfacing with components of another integrated circuit (e.g., acceleration hardware), thereby reducing power consumed by such a system and/or components thereof (e.g., the processor).

In some embodiments, the subject disclosure (e.g., radio frequency identification (RFID) tag device 202, radio frequency identification (RFID) device 204, and/or integrated circuit device 102) can employ hardware and/or software to solve problems that are highly technical in nature, that are not abstract and that cannot be performed as a set of mental acts by a human. In some embodiments, some of the processes described herein may be performed by one or more specialized computers (e.g., one or more specialized processing units such as, for example, processor 104 and/or accelerator component 108) for carrying out defined tasks related to data communication cryptography implemented by radio frequency identification devices. In some embodiments, the subject disclosure (e.g., radio frequency identification (RFID) tag device 202, radio frequency identification (RFID) device 204, and/or integrated circuit device 102) and/or components thereof, can be employed to solve new problems that arise through advancements in technologies mentioned above, employment of cloud-computing systems, computer architecture, and/or another technology.

It is to be appreciated that the subject disclosure (e.g., radio frequency identification (RFID) tag device 202, radio frequency identification (RFID) device 204, and/or integrated circuit device 102) can perform a radio frequency identification data cryptography process utilizing various combinations of electrical components, mechanical components, and circuitry that cannot be replicated in the mind of a human or performed by a human. For example, executing a cryptographic module and/or communicating over a network with a radio frequency identification reader device based on such cryptographic module, are operations that are greater than the capability of a human mind. For instance, the amount of data processed, the speed of processing such data, and/or the types of data processed by the subject disclosure (e.g., radio frequency identification (RFID) tag device 202, radio frequency identification (RFID) device 204, and/or integrated circuit device 102) over a certain period of time can be greater, faster, and/or different than the amount, speed, and/or data type that can be processed by a human mind over the same period of time.

According to several embodiments, the subject disclosure (e.g., radio frequency identification (RFID) tag device 202, radio frequency identification (RFID) device 204, and/or integrated circuit device 102) can also be fully operational towards performing one or more other functions (e.g., fully powered on, fully executed, etc.) while also performing the above-referenced radio frequency identification data cryptography process. It should be appreciated that such simultaneous multi-operational execution is beyond the capability of a human mind. It should also be appreciated that the subject disclosure (e.g., radio frequency identification (RFID) tag device 202, radio frequency identification (RFID) device 204, and/or integrated circuit device 102) can include information that is impossible to obtain manually by an entity, such as a human user. For example, the type, amount, and/or variety of information included in integrated circuit device 102, processor 104, memory 106, accelerator component 108, data modulator-demodulator 110, rectifier 112, radio frequency (RF) antenna 114, radio frequency identification (RFID) tag device 202, radio frequency identification (RFID) device 204, sensors 302, non-volatile memory 304, radio frequency (RF) receiver 306, radio frequency (RF) transmitter 308, power management unit (PMU) 310, power storage device 312, data communication module 314, core 316, and/or data logging component 502 can be more complex than information obtained manually by a human user.

Figure 6:
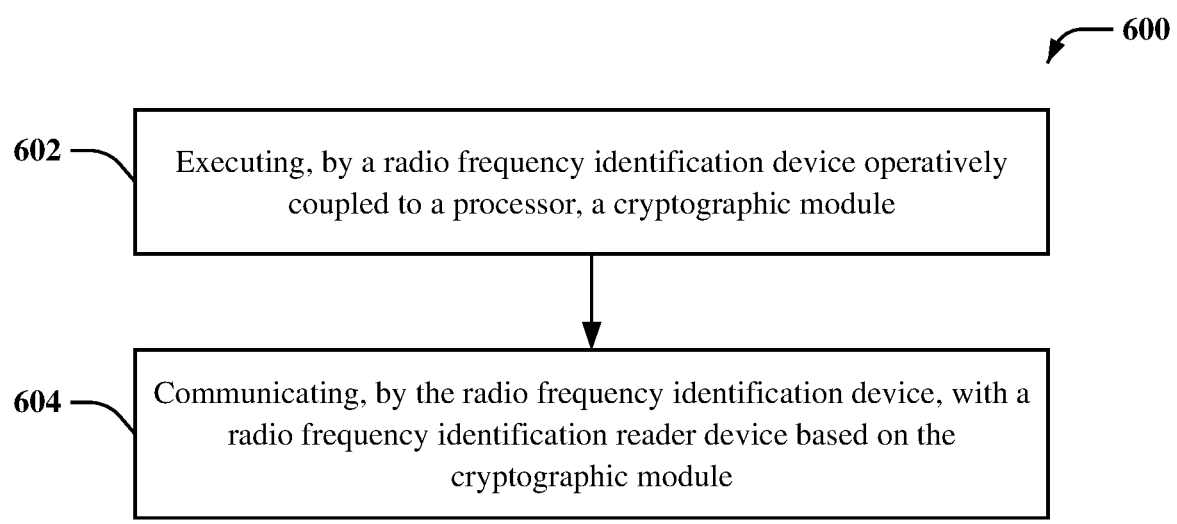
FIG. 6 illustrates a flow diagram of an example, non-limiting computer-implemented method that can facilitate radio frequency identification components in accordance with one or more embodiments described herein.

FIG. 6 illustrates a flow diagram of an example, non-limiting computer-implemented method 600 that can facilitate radio frequency identification components in accordance with one or more embodiments described herein. Repetitive description of like elements and/or processes employed in respective embodiments is omitted for sake of brevity.

At 602, executing, by a radio frequency identification device (e.g., integrated circuit device 102, radio frequency identification (RFID) tag device 202, and/or radio frequency identification (RFID) device 204) operatively coupled to a processor (e.g., processor 104, accelerator component 108, and/or core 316), a cryptographic module. In some embodiments, such a radio frequency identification device can employ accelerator component 108 to execute a cryptographic module including, but not limited to, an encryption module, a decryption module, a hashing module, a secure hash algorithm (SHA) module, an advanced encryption standard (AES) module, an elliptic curve digital signature algorithm (ECDSA) public key module, and/or another cryptographic module.

At 604, communicating, by the radio frequency identification device (e.g., integrated circuit device 102, radio frequency identification (RFID) tag device 202, and/or radio frequency identification (RFID) device 204), with a radio frequency identification reader device (e.g., radio frequency identification (RFID) reader device 206) based on the cryptographic module (e.g., as described above with reference to FIGS. 1, 2, 3, 4, and 5).

Figure 7:
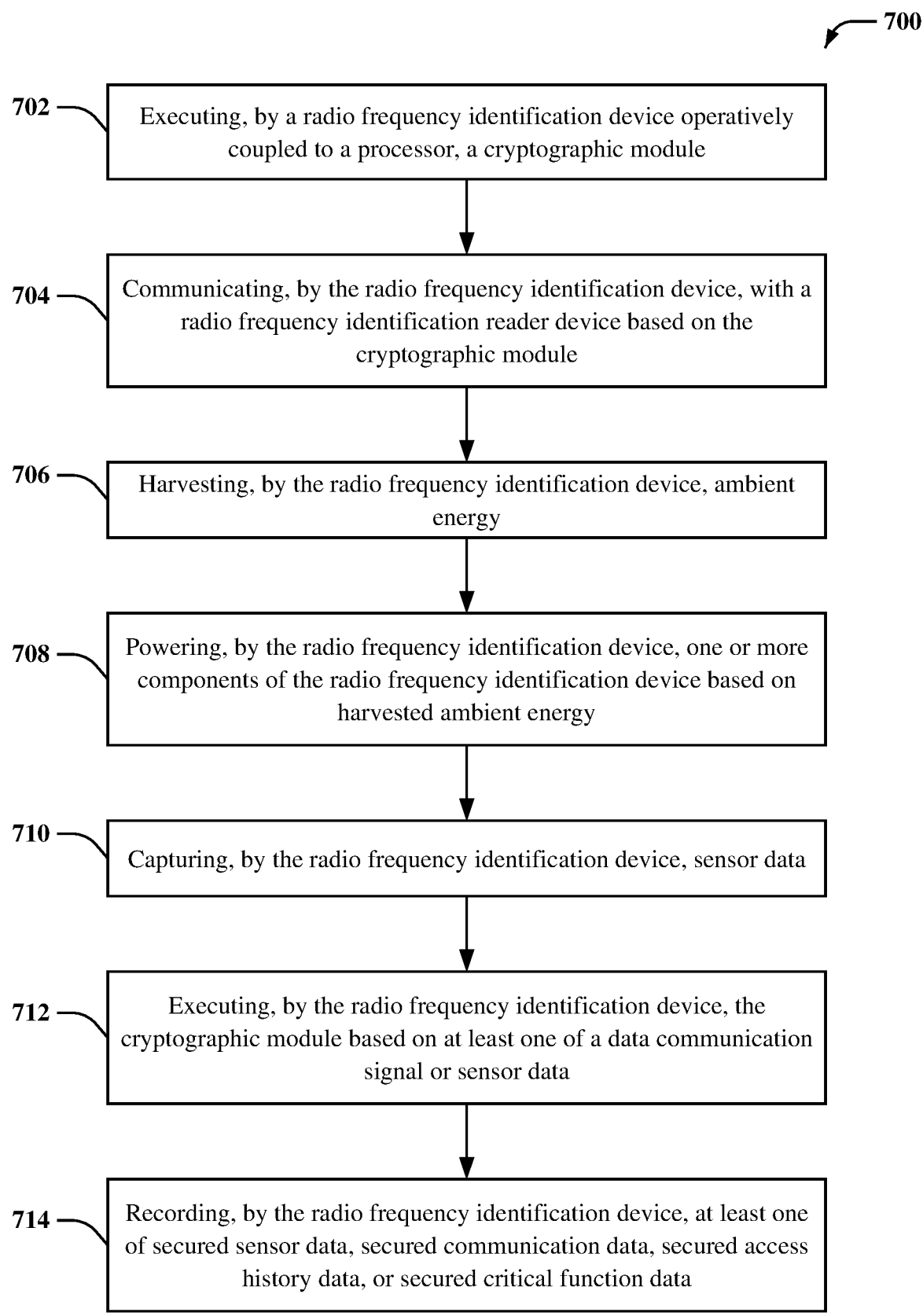
FIG. 7 illustrates a flow diagram of an example, non-limiting computer-implemented method that can facilitate radio frequency identification components in accordance with one or more embodiments described herein.

FIG. 7 illustrates a flow diagram of an example, non-limiting computer-implemented method 700 that can facilitate radio frequency identification components in accordance with one or more embodiments described herein. Repetitive description of like elements and/or processes employed in respective embodiments is omitted for sake of brevity.

At 702, executing, by a radio frequency identification device (e.g., integrated circuit device 102, radio frequency identification (RFID) tag device 202, and/or radio frequency identification (RFID) device 204) operatively coupled to a processor (e.g., processor 104, accelerator component 108, and/or core 316), a cryptographic module. In some embodiments, such a radio frequency identification device can employ accelerator component 108 to execute a cryptographic module including, but not limited to, an encryption module, a decryption module, a hashing module, a secure hash algorithm (SHA) module, an advanced encryption standard (AES) module, an elliptic curve digital signature algorithm (ECDSA) public key module, and/or another cryptographic module.

At 704, communicating, by the radio frequency identification device (e.g., integrated circuit device 102, radio frequency identification (RFID) tag device 202, and/or radio frequency identification (RFID) device 204), with a radio frequency identification reader device (e.g., radio frequency identification (RFID) reader device 206) based on the cryptographic module (e.g., as described above with reference to FIGS. 1, 2, 3, 4, and 5).

At 706, harvesting, by the radio frequency identification device (e.g., integrated circuit device 102, rectifier 112, radio frequency (RF) antenna 114, radio frequency identification (RFID) tag device 202, and/or radio frequency identification (RFID) device 204), ambient energy (e.g., electromagnetic energy of radio waves intercepted by radio frequency (RF) antenna 114 as described above with reference to FIG. 1).

At 708, powering, by the radio frequency identification device (e.g., via integrated circuit device 102, radio frequency identification (RFID) tag device 202, radio frequency identification (RFID) device 204, power management unit (PMU) 310, and/or power storage device 312), one or more components of the radio frequency identification device (e.g., processor 104, non-volatile memory 304, etc.) based on harvested ambient energy (e.g., electromagnetic energy of radio waves intercepted by radio frequency (RF) antenna 114 and converted to direct electric current by rectifier 112 as described above with reference to FIG. 1).

At 710, capturing, by the radio frequency identification device (e.g., integrated circuit device 102, radio frequency identification (RFID) tag device 202, radio frequency identification (RFID) device 204, and/or sensors 302), sensor data.

At 712, executing, by the radio frequency identification device (e.g., integrated circuit device 102, accelerator component 108, radio frequency identification (RFID) tag device 202, and/or radio frequency identification (RFID) device 204), the cryptographic module based on at least one of a data communication signal (e.g., data communication signals received by and/or transmitted by such radio frequency identification device as described above with reference to FIGS. 1, 2, 3, 4, and 5) or sensor data (e.g., sensor data captured by sensors 302).

At 714, recording, by the radio frequency identification device (e.g., integrated circuit device 102, radio frequency identification (RFID) tag device 202, radio frequency identification (RFID) device 204, and/or data logging component 502), at least one of secured sensor data, secured communication data, secured access history data, or secured critical function data.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
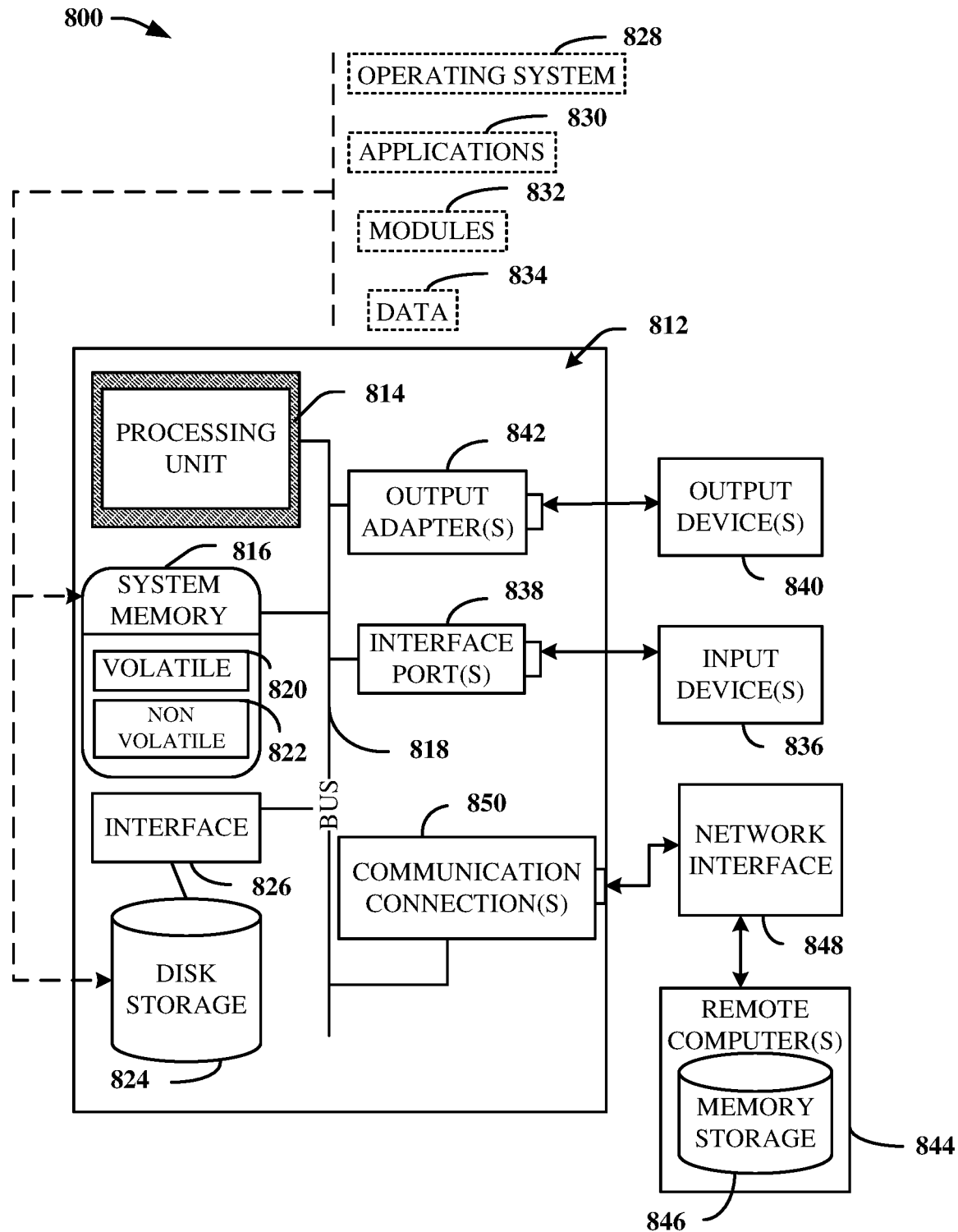
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection (s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
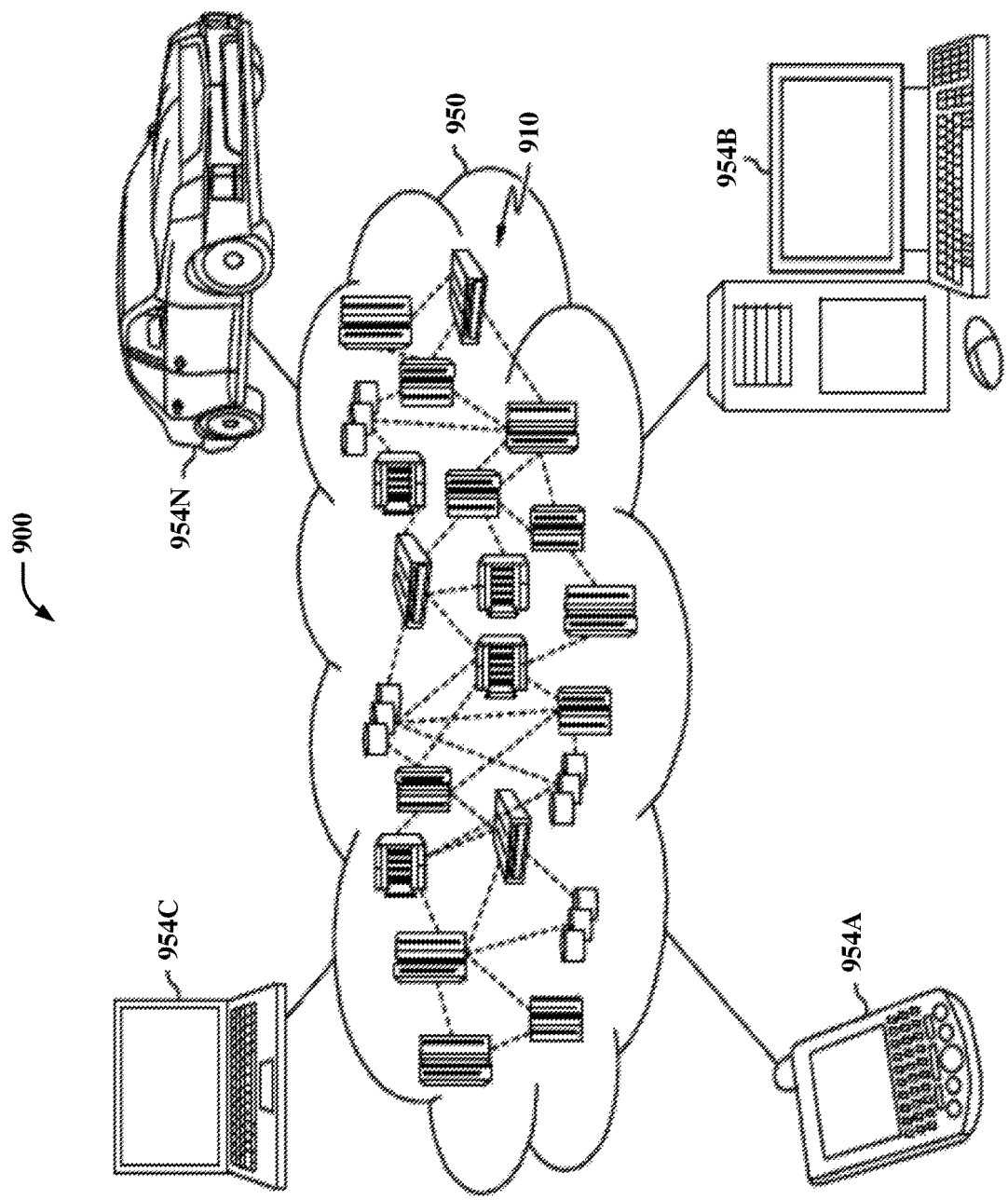
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
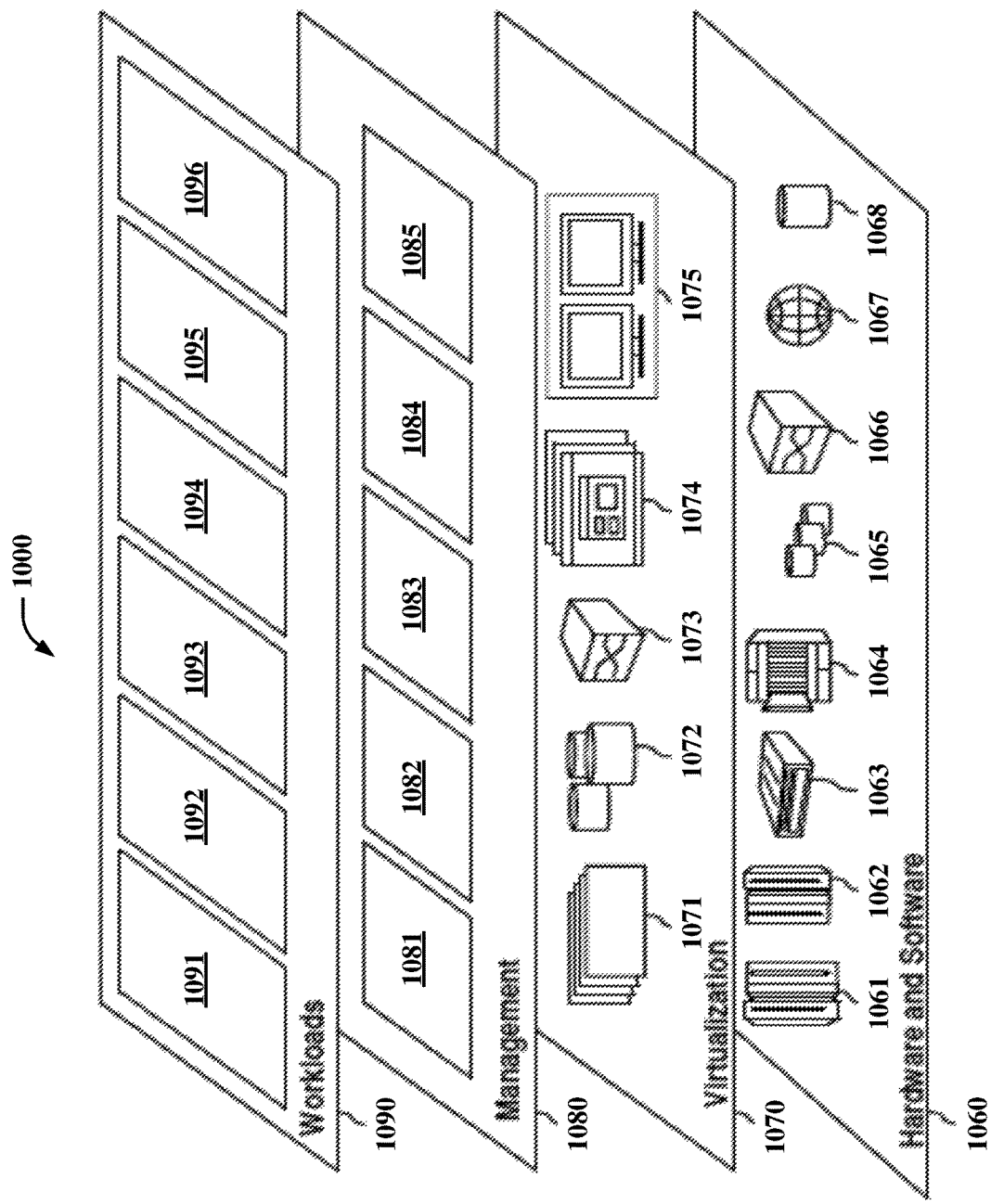
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and radio frequency identification software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising:
a memory coupled to an integrated circuit device, wherein the integrated circuit device comprises a processor and a hardware security accelerator component that accelerates one or more functions of the integrated circuit device and executes a cryptographic module, wherein the hardware security accelerator component accelerates the one or more functions of the integrated circuit device at a level of speed greater than a second level of speed of the processor; and
a radio frequency identification device coupled to the integrated circuit device that communicates with a radio frequency identification reader device based on the cryptographic module.

2. The device of claim 1, wherein the cryptographic module is selected from a group consisting of: an encryption module; a decryption module; a hashing module; a secure hash algorithm module; an advanced encryption standard module; and an elliptic curve digital signature algorithm public key module.

3. The device of claim 1, wherein the integrated circuit device further comprises at least one of: a Benes network; a radio frequency antenna; a radio frequency receiver device; a radio frequency transmitter device; a rectifier device; a power storage device; a power management unit; one or more sensors; or the memory.

4. The device of claim 1, wherein at least one of the radio frequency identification device or the integrated circuit device comprises an energy harvesting component that harvests ambient energy to power at least one of the processor, the accelerator component, or the memory.

5. The device of claim 1, wherein at least one of the device, the radio frequency identification device, or the integrated circuit device comprises one or more sensors that capture sensor data.

6. The device of claim 1, wherein the accelerator component executes the cryptographic module based on at least one of a data communication signal or sensor data.

7. The device of claim 1, wherein at least one of the radio frequency identification device or the integrated circuit device comprises the memory, and wherein the memory stores a computer executable data logging component executed by the processor that records at least one of secured sensor data, secured communication data, secured access history data, or secured critical function data.

8. The device of claim 1, wherein the accelerator component executes the cryptographic module to facilitate at least one of improved processing performance or reduced power consumption associated with the processor.

9. A computer-implemented method, comprising:
executing, by a radio frequency identification device operatively coupled to a processor, a cryptographic module;
communicating, by the radio frequency identification device, with a radio frequency identification reader device based on the cryptographic module;
capturing, by the radio frequency identification device, sensor data; and
controlling, by the radio frequency identification device, an accelerator component to execute the cryptographic module to perform one or more sensor data pre-processing functions associated with the sensor data, wherein the controlling is based on receipt of the sensor data by the processor.

10. The computer-implemented method of claim 9, wherein the executing comprises, executing, by the radio frequency identification device, at least one of: an encryption module; a decryption module; a hashing module; a secure hash algorithm module; an advanced encryption standard module; or an elliptic curve digital signature algorithm public key module.

11. The computer-implemented method of claim 9, further comprising:
harvesting, by the radio frequency identification device, ambient energy; and
powering, by the radio frequency identification device, one or more components of the radio frequency identification device based on harvested ambient energy.

12. The computer-implemented method of claim 9, wherein the executing comprises, executing, by the radio frequency identification device, the cryptographic module based on at least one of a data communication signal or sensor data, thereby facilitating improved security of at least one of the data communication signal or the sensor data.

13. The computer-implemented method of claim 9, further comprising recording, by the radio frequency identification device, at least one of secured sensor data, secured communication data, secured access history data, or secured critical function data.

14. A system, comprising:
a radio frequency identification tag device having a memory coupled to an integrated circuit device, wherein the integrated circuit device comprises a processor and an electronic circuit that embodies an accelerator component, wherein the accelerator component executes a cryptographic module and also accelerates one or more functions of the integrated circuit device at a level of efficiency greater than a second level of efficiency of the processor; and
a radio frequency identification reader device that communicates with the radio frequency identification tag device based on the cryptographic module.

15. The system of claim 14, wherein the cryptographic module is selected from a group consisting of: an encryption module; a decryption module; a hashing module; a secure hash algorithm module; an advanced encryption standard module; and an elliptic curve digital signature algorithm public key module.

16. The system of claim 14, wherein the integrated circuit device further comprises at least one of: a Benes network; a radio frequency antenna; a radio frequency receiver device; a radio frequency transmitter device; a rectifier device; a power storage device; a power management unit; one or more sensors; or the memory.

17. The system of claim 14, wherein at least one of the radio frequency identification tag device or the integrated circuit device comprises an energy harvesting component that harvests ambient energy to power at least one of the processor, the accelerator component, or the memory.

18. The system of claim 14, wherein at least one of the radio frequency identification tag device or the integrated circuit device comprises one or more sensors that capture sensor data.

19. The system of claim 14, wherein the integrated circuit device comprises the memory, and wherein the memory stores a computer executable data logging component executed by the processor that records at least one of secured sensor data, secured communication data, secured access history data, or secured critical function data.

* * * * *